United States Patent [19]

Bosnia

[11] Patent Number: 4,460,423
[45] Date of Patent: Jul. 17, 1984

[54] METHOD FOR MANUFACTURING A RACKET STRUCTURE

[76] Inventor: Omar J. Bosnia, Juncal 1319, Buenos Aires, Argentina

[21] Appl. No.: 466,137

[22] Filed: Feb. 14, 1983

Related U.S. Application Data

[62] Division of Ser. No. 337,150, Jan. 5, 1982, Pat. No. 4,394,015.

[51] Int. Cl.³ ............................ B29C 6/00; B29D 3/00
[52] U.S. Cl. .................................... 156/185; 156/78; 156/222; 156/245; 264/46.5; 264/46.6; 264/46.7; 264/135; 264/229; 264/261; 264/272.1; 264/225
[58] Field of Search ............... 264/46.4, 46.6, 46.5, 264/46.7, 46.9, 103, 134, 135, 257, 258, 261, 271.1, 275, 277, 279, 279.1, 295, 137, 229, 231; 156/166, 161, 189, 245, 217, 228, 229, 185, 78, 79; 273/73 C, 73 K, 73 J, 73 H, 73 E, 73 G, 73 F, 80 B

[56] References Cited

U.S. PATENT DOCUMENTS

| | | | |
|---|---|---|---|
| 2,626,804 | 1/1953 | Robinson | 273/73 F |
| 3,483,055 | 12/1969 | Eshbaugh | 156/189 |
| 3,764,137 | 10/1973 | Petro | 273/80 B |
| 3,878,278 | 4/1975 | Miller et al. | 264/46.7 |
| 3,892,891 | 7/1975 | Robin | 264/231 |
| 4,029,037 | 6/1977 | Hogan | 264/46.7 |
| 4,124,670 | 11/1978 | Cecka et al. | 264/46.6 |
| 4,128,963 | 12/1978 | Dano | 156/245 |
| 4,129,634 | 12/1978 | Cecka et al. | 264/46.6 |
| 4,167,430 | 9/1979 | Arachi | 156/245 |
| 4,264,389 | 4/1981 | Staub et al. | 156/245 |
| 4,283,050 | 8/1981 | Nagamoto | 273/73 K |
| 4,413,822 | 11/1983 | Fernandez et al. | 264/46.6 |

FOREIGN PATENT DOCUMENTS

| | | | |
|---|---|---|---|
| 2721715 | 12/1977 | Fed. Rep. of Germany | 273/73 C |
| 1436755 | 5/1976 | United Kingdom | 273/73 F |

*Primary Examiner*—Michael W. Ball
*Attorney, Agent, or Firm*—Birch, Stewart, Kolasch & Birch

[57] ABSTRACT

A racket structure to be used in a tennis and the like racket and a method for producing it, where the handle section and the head frame section are made of a one-piece composite member including an inner light weight soft plastic core member having a central pre-stressed multifilament cord member and a glass fibers reinforced hard plastic, outer surrounding layer, anchored on said core member within the head frame section, said surrounding layer being covered on opposite faces with respective resilient flat cover members which also sheath part of the height of said head frame section on the inside face, facing the netting, defining the striking surface stretched in the oval space defined by the head frame section of the racket.

6 Claims, 17 Drawing Figures

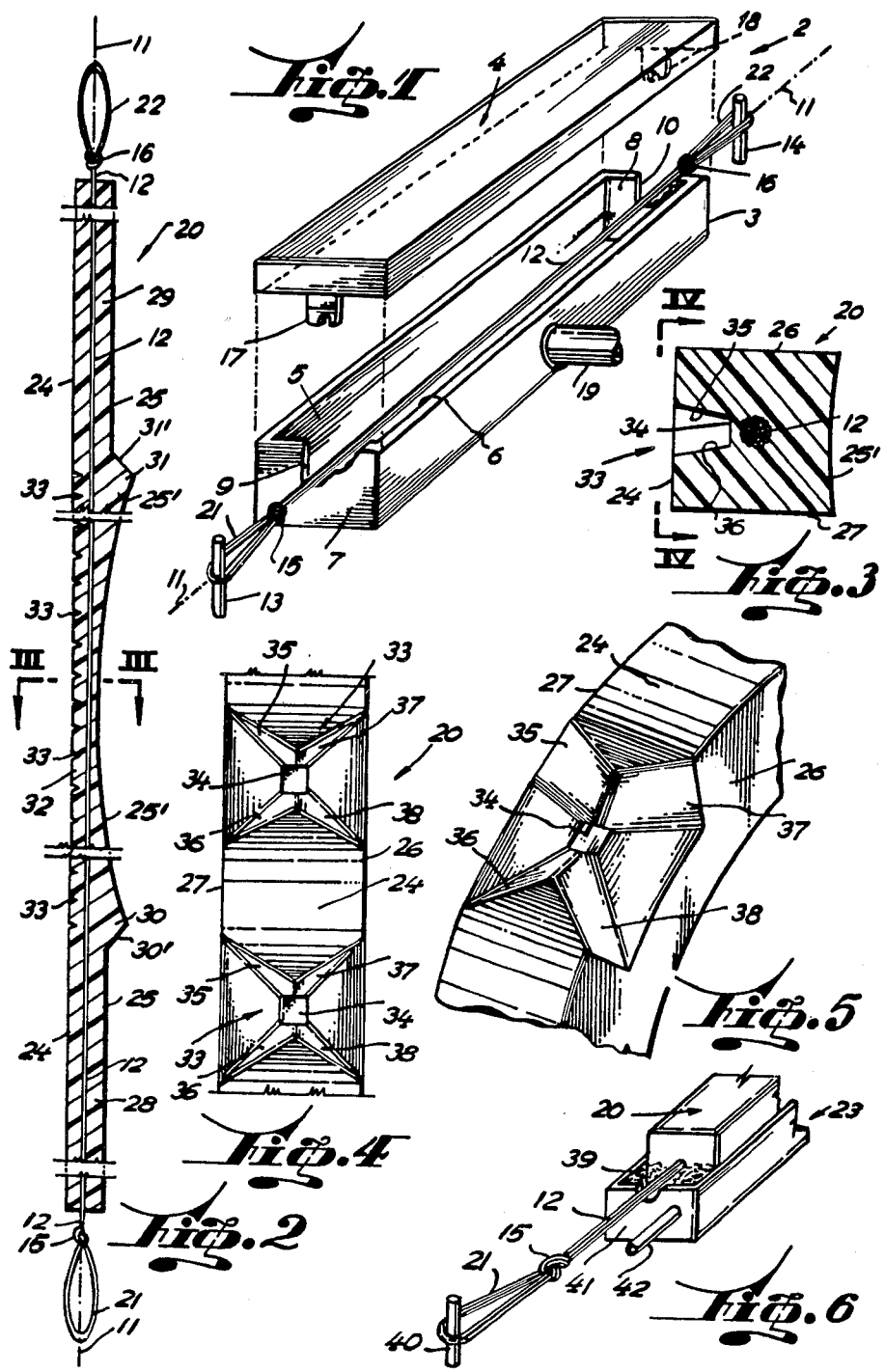

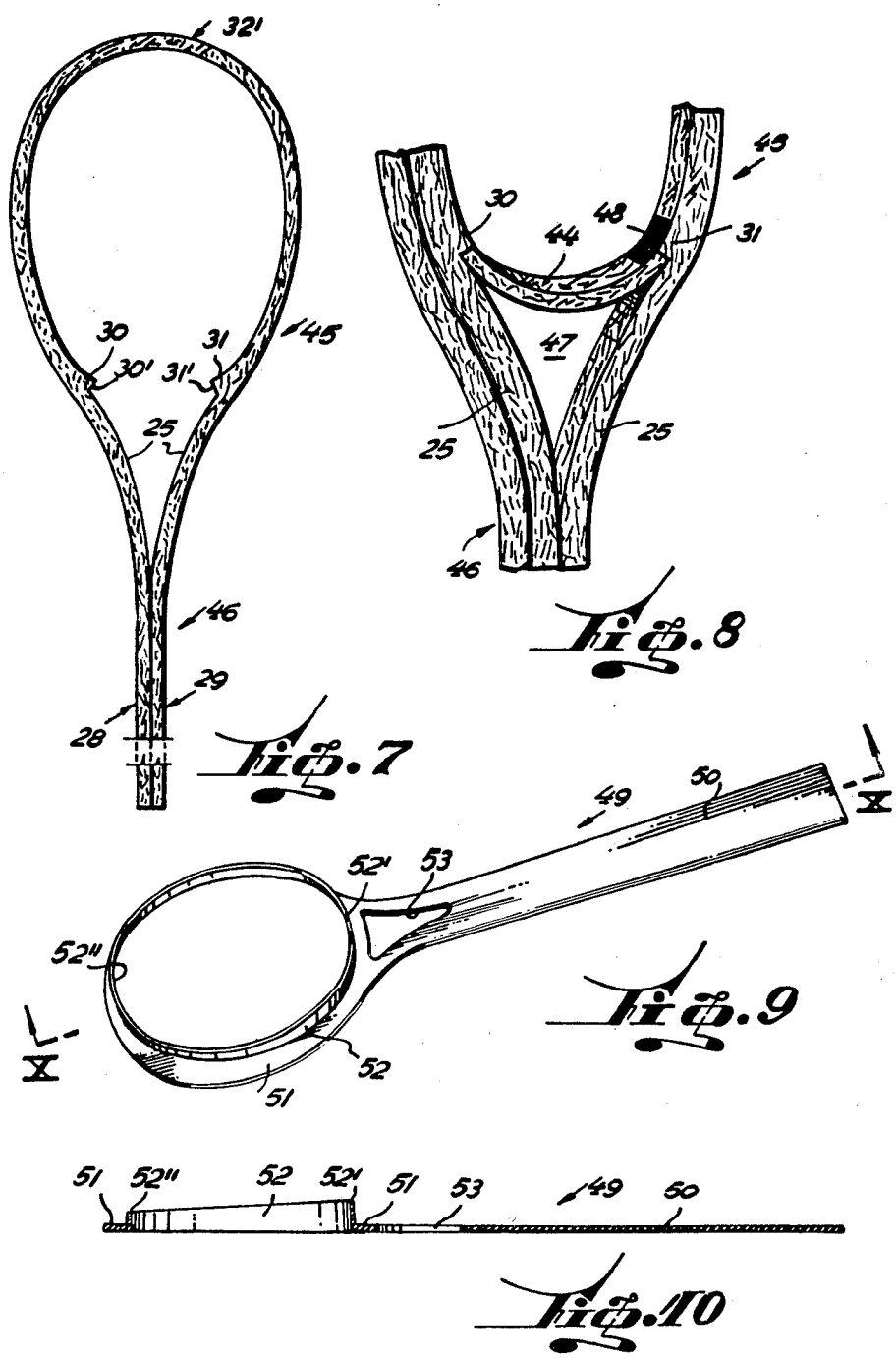

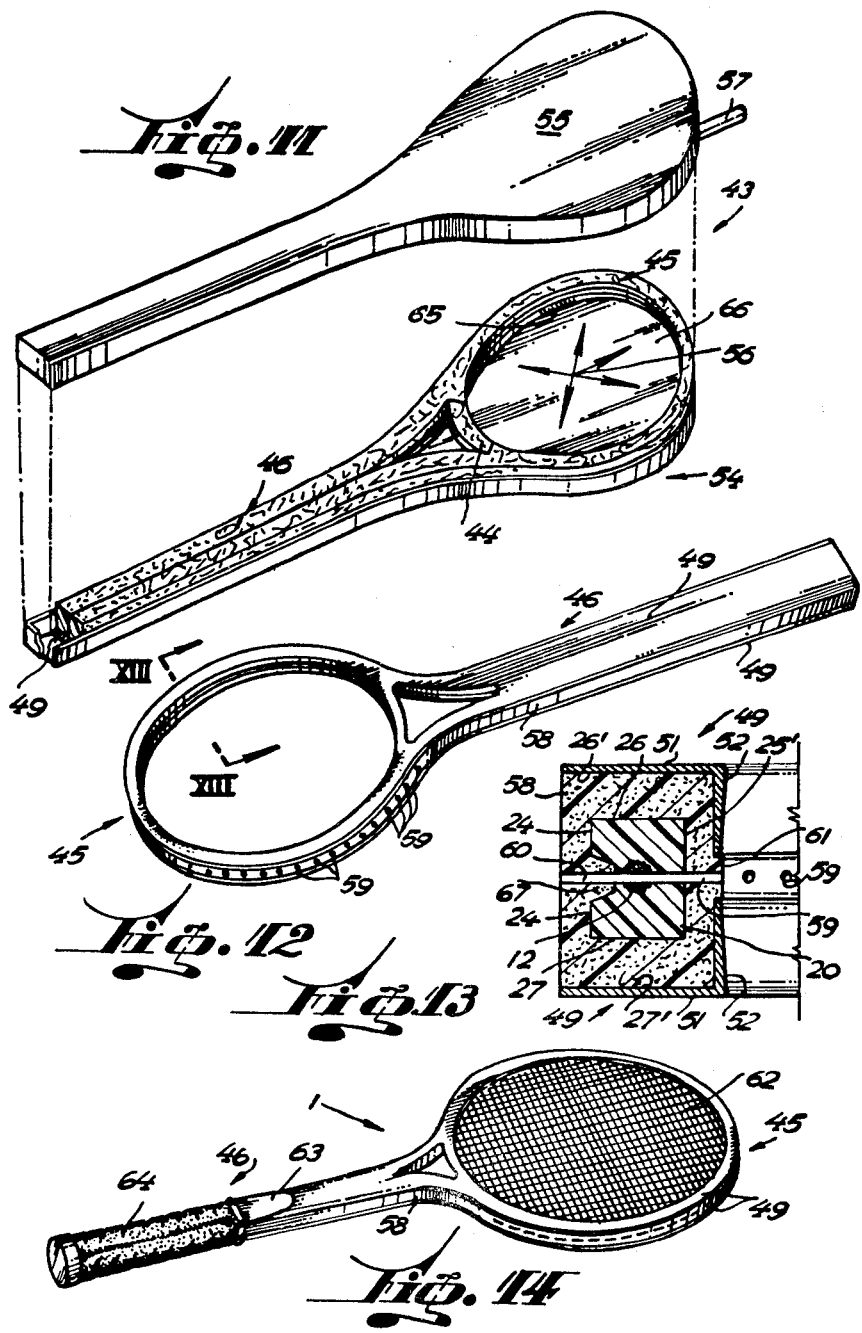

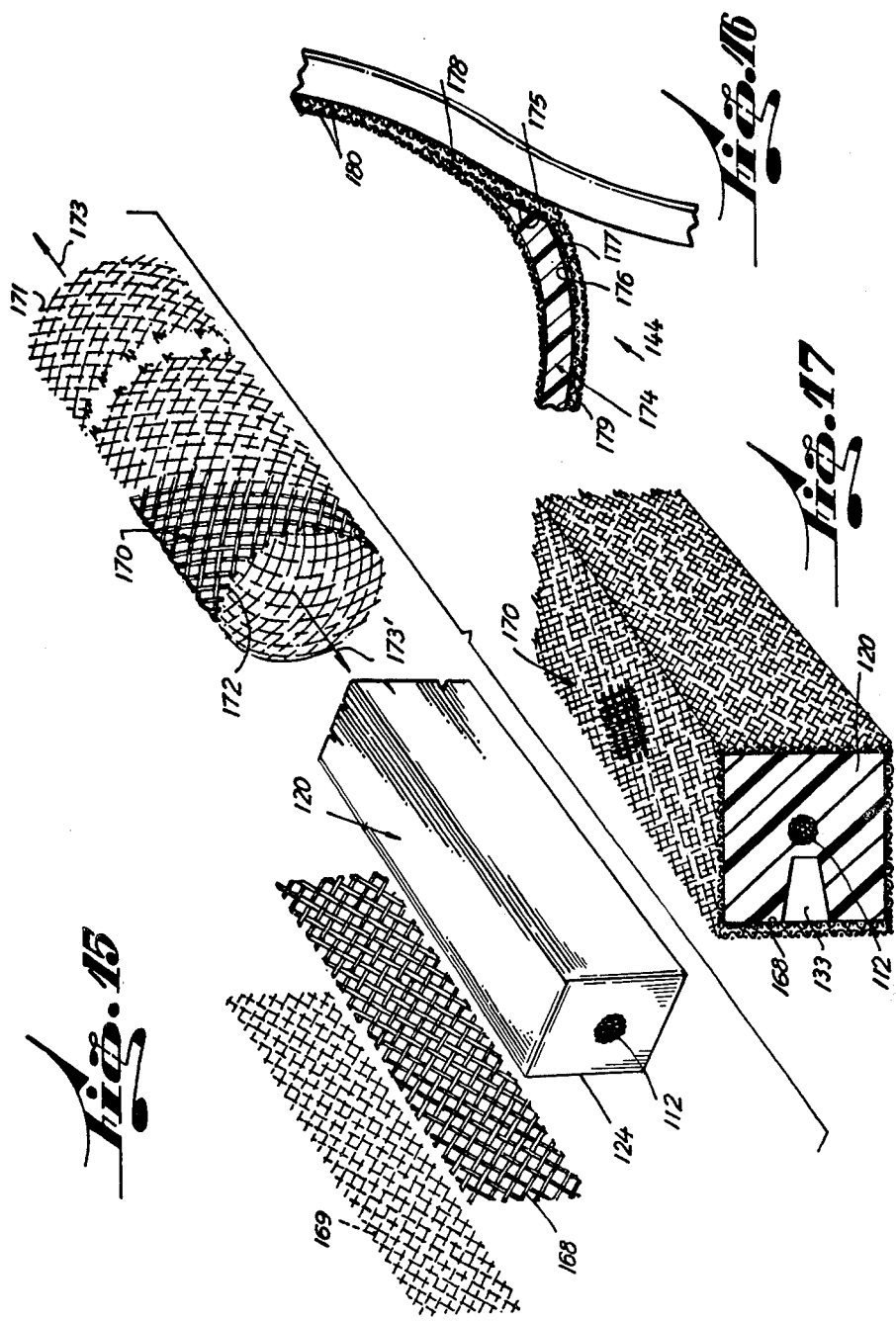

METHOD FOR MANUFACTURING A RACKET STRUCTURE

This application as a divisional of copending application Ser. No. 337,150, filed on Jan. 5, 1982, now U.S. Pat. No. 4,394,015.

BACKGROUND OF THE INVENTION

1. Field of the Invention

The present invention relates to a method for manufacturing a racket structure to be used for tennis and the like games.

2. Description of the Prior Art

Strung rackets for use in tennis and similar games have long been made from solid wood and strung with gut or nylon strings. The playing characteristics of wood rackets vary greatly due to natural variations in the wood used and manufacturing process variables.

More recently steel and aluminium rackets have been developed in order to obtain greater uniformity. Metal rackets unfortunately will not provide the same playing qualities as wood rackets, since sufficient stiffness cannot be provided without excessive weight.

Lately rackets are also being manufactured from glass fiber reinforced plastics. In order to avoid that these reinforced plastics become too heavy, composite body members of the most variable types have already been proposed in an effort to reduce the weight without losing stiffness. All these previous proposals require complicated molds to produce the several portions to integrate the composite member and special molds for each size and weight, so that the rackets become rather expensive. Typical examples are U.S. Pat. Nos. 3,889,951 (Schaefer et al) and 3,949,988 (Staufer), respectively granted on June 17, 1975 and Apr. 13, 1976.

SUMMARY OF THE INVENTION

Several concepts have been unified in the racket structure according to the present invention. A first aim is that the vibrations which are generated during each stroke and transmitted through the handle, to the players forearm, tending to tire the muscles, are muffled as much as possible within the handle section, particularly within the grip portion, without jeopardizing the efficiency of the striking impact performed by the player on the ball.

Furthermore in the head frame section where the transverse holes are provided through which the taut string passes, the structure should be suitable in order to avoid an excessive friction between the frame structure and the string, to reduce wear and tear on the one hand and yet the vibration transmitting feature should be muffled on the other hand.

Another aspect is that rackets or different weight and sizes should be manufacturable with a single size of core member.

The compactness and/or weight of the hard plastic layer which sheathes the core member, as will be later explained, can be varied at will during manufacture and within the same mold.

The core member is of a soft and light-weight plastic, which is capable of muffling the vibrations generated by the netting on the one hand, at the same time as it does not substantially muffle directly the strings, since within the core member and directly surrounding each string, there is a prestressed longitudinal, multifilament, member. Thus the soft core member will only receive through such a prestressed member the vibrations and muffle them before transmitting them to the racket's handle, thereby minimizing the tiring effect on the forearm and elbow.

Furthermore the inside face of the oval opening defined by the head frame section and within which the netting is located, is sheathed by rims of a different material having another behaviour than the hard plastic layer and which rims have the capacity of cooperating in absorbing strong impacts, in case the ball impacts on the netting adjacent the frame. The rims are preferably made of aluminium or an alloy thereof and form part of respective cover members which cover most of the part of the main body of the racket.

The racket structure according to the present invention comprises a one-piece composite member having two contiguous parallel straight end portions continuing into an intermediate open oval shaped, arcuate portion, a bridge portion extending between and connected to said end portions adjacent the beginning of said arcuate portion and closing said open oval shaped arcuate portion, said bridge and oval portions defining a head frame section for stringing with a taut string said head frame section to form a striking surface, said parallel straight end portions defining a handle section with a grip, said one-piece composite member having an inner light-weight soft plastic core member defining a longitudinal center line and having an inner face, an outer face and further including a central prestressed longitudinal cord member, said open oval shaped arcuate portion of said core member having between said center line and said outer face, crosswise to said center line arranged spaced apart anchoring recesses each continuing by a bore from said center line towards said inner face, each of said bores being oriented towards the space circumscribed by said frame section, a glass fiber reinforced outer hard plastic layer, sheathing said core and entering said recesses by way of anchoring portions, each of said anchoring portions including a perforation coaxial with the pertinent bore, a pair of resilient, flat cover members mounted on opposite sides on said composite member, each cover member having a head portion and a handle portion, each head portion being of oval shape substantially equal to the shape of said head frame section, each handle portion being of substantially the same shape as said handle section, an endless oval shaped inner rim integral with said head portion, the height of said rim being less than half the height of the inner face of said head frame section, and each rim abutting on said inner face and leaving between them a central free portion into which end said bores for said string.

The present invention furthermore comprises a method for manufacturing a racket structure, comprising the steps of providing a first elongate mold defining a center line; locating through said mold in the longitudinal direction thereof, coaxial with said center line a cord member; prestressing said cord member; injecting a light-weight soft plastic in said mold to form a parallelepipedic core member having a first straight end portion, an intermediate portion and a second straight end portion, said core member defining an outer face, an inner face and a pair of opposite side faces, said intermediate portion further having between its outer face and said cord member, spaced apart anchoring recesses which are cross-wise arranged to said cord member and ending in said side faces; forming a glass fiber reinforcing layer around said core member; providing a further mold substantially of the shape of a racket, said further mold including a casing and a lid for said casing and each having a bottom; locating on the bottom of said casing and of said lid respectively a resilient metal, flat cover member having a head portion and a handle portion, each head portion being of oval ring shape including an upstanding inner endless oval rim, which rims are facing each other but being spaced apart upon the mold being in closed position; bending the intermediate structure achieved in the further mold to form two contiguous, parallel, straight end portions and an intermediate open oval shaped, arcuate portion, locating a bridge portion of the same intermediate structure between and connecting to the confluence of said straight end portions and arcuate portion to close said open oval shaped arcuate portion, locating the bent intermediate structure including said bridge in said casing and between said flat cover members, and closing the casing by means of said lid; perforating said closed oval shaped arcuate portion by an array of needles to define bores for the stringing of the racket to be produced; injecting a hard plastic into said mold to cover said core member and becoming located between said flat cover members and bound thereto, whereby said glass fiber reinforcing layer becomes the reinforcement for said hard plastic; withdrawing said array of needles and thereafter the resulting racket structure from said third mold.

Further details of the invention will become apparent from the specific structure preferred embodiments hereinbelow disclosed by way of example.

BRIEF DESCRIPTION OF THE DRAWINGS

FIG. 1 is a very schematic showing in perspective view of a first mold (with small portions broken away), wherein the lightweight soft plastic core member is to be manufactured.

FIG. 2 is a longitudinal section of a first embodiment of the light-weight soft plastic core member molded in the mold of FIG. 1.

FIG. 3 is a cross-section along line III—III of FIG. 2.

FIG. 4 is a top plan view along line IV—IV of FIG. 3.

FIG. 5 is a detail in perspective view of a portion of the open oval shaped arcuate portion of the lightweight soft plastic core member according to said first embodiment.

FIG. 6 is a very schematical perspective view of a portion of the second mold used for sheathing the lightweight soft plastic core member with a network defining a jacket of randomly distributed glass fibers to form a reinforcing layer to sheath said lightweight soft plastic core member according to the first embodiment.

FIG. 7 is a schematic plan view showing the glass fiber sheathed soft core member, bent to define the core member of the future racket structure according to a first embodiment.

FIG. 8 is a detail in perspective view of a portion of the core member shown in FIG. 7, to which already a bridge portion according to a first embodiment, is attached.

FIG. 9 is a perspective view of a resilient flat metal cover member.

FIG. 10 is a longitudinal section along line X—X of FIG. 9.

FIG. 11 is a very schematic perspective view of an open third mold, housing the fiber sheathed core member of FIGS. 7 and 8 and the resilient metal flat cover member of FIG. 9.

FIG. 12 is a perspective view of the resulting racket structure provided by means of the third mold of FIG. 11.

FIG. 13 is a cross section along line XIII—XIII of FIG. 12.

FIG. 14 is a perspective view of a tennis racket including the racket structure according to the present invention and being already provided with the netting.

FIG. 15 is a detail in exploded perspective view of a portion of a light-weight soft plastic core member, according to a second embodiment and the glass fiber reinforcing means to be attached thereto.

FIG. 16 is a side elevation of part of a bridge portion according to a second embodiment, where its reinforcing means are shown in section.

FIG. 17 is a perspective view partially in section, showing part of the core member with reinforcing means according to the second embodiment.

In order to manufacture a one-piece composite member forming the main body of a racket, such as tennis racket 1 (see FIG. 14) a first elongate injection mold 2, only very schematically shown in FIG. 1, is used, comprising a casing 3 and a lid 4. The inner walls 5 and 6 are of a more developed structure than shown, as will be readily understood when explaining FIGS. 2 to 5 and which structure is not shown in FIG. 1 in order to avoid overburdening the drawing. The end walls 7 and 8 of casing 3 are each provided with a cutout portion 9, 10 which define by means of their respective bottom portions when the elongate mold 1 is closed by means of lid 4, a longitudinal center line 11 along which a central prestressed longitudinal multifilament cord member 12 (only schematically shown) is to be located and which is anchored around retaining rods 13,14. Conveniently the ends of the cord member 12 define slidable knots 15, 16 outside the respective end walls 7 and 8 and which may be moved towards said end walls 7, 8 in order to prestress the multifilament cord member 12. The lid 4 has cover tongues 17, 18 which, upon the lid 4 being located on the casing 3, close the cutout portions 9 and 10. An inlet pipe 19 ends into the inner wall 6 and may be connected to a suitable soft plastic injection nozzle (not shown).

The cord member 12 is preferably a 60-thread multifilament glass fiber strand. Other suitable materials such as monofilaments made of nylon and the like, which offer a similar tensile resistance, may be used to form the multifilament cord member.

Once the mold 2 is closed, soft plastic forming material is injected through inlet pipe 19 to form a foamed plastic structure, such as a polyurethane structure having a specific weight of about 0.15. Other polymeric foamed materials may be used such as a polyester resin or an epoxy resin.

Referring now to FIGS. 2 to 5, where the resulting structure of the core member according to a first embodiment is more specifically shown and which will now be described, it will be possible to understand how the actual structure of the inner walls 5 and 6 of the mold 2 have to be. From FIG. 3 it is apparent that the cord member 12 is actually a multifilament strand.

The parallelepipedic core member 20 which results from the molding in mold 2 and which is to be withdrawn therefrom after removing the lid 4 from the casing 3, is actually removed from the casing by using the loop end portions 21, 22 as handles. This core member 20, according to the first embodiment is then to be housed in the second mold 23, part of which is schematically shown in FIG. 6 and to which reference will be made later on.

The resulting parallelepipedic core member 20 is in general of a square cross-section and comprises an outer face 24, an inner face 25 and a pair of side faces 26, 27. The core member 20 defines a pair of straight end portions 28, 29 and an intermediate portion 32, the inner face of which is arcuate and more particularly is a concave portion 25', the ends of which project beyond the plane defined by the inner faces 25 of the straight end portions 28, 29 and thereby forms with them respective first anchoring portions 30, 31, having converging outside faces 30',31'. Thus in between the first anchoring portions 30,30', the core member 20 defines said intermediate portion 32.

However, as will be explained towards the end of this specification, where a second embodiment will be described, the core member (20) may be a parallelepipedic member of substantially uniform cross section along its length. In other words the arcuate inner concave portion (25') and the first anchoring portions (30, 31) are not essential for all embodiments.

Returning now to the first embodiment, the outer face 24 in the portion corresponding to said intermediate portion 32 has anchoring recesses 33. These recesses 33 are to be generally used in all the embodiments.

One of said recesses 33, which are all substantially of the same shape, will now be more specifically described in relationship to FIGS. 3 to 5. Each recess 33 has outwardly spreading wings and a generally "V-shaped" cross-section with a central bottom portion 34 located near said center line 11 and more specifically adjacent said multifilament cord member 12. The recess 33 which debouches in said outer face 24 is furthermore defined by side walls 35, 36, 37, 38 all of which are convergent towards the bottom 34, but are also pairwise 35, 37 and 36, 38 divergent towards the side faces 27, 26 thereby forming said spreading wings.

The inner walls 5 and 6 of mold 2 (FIG. 1) have actually pertinent shapes to define the anchoring recesses 33 and first anchoring portions 30, 31, as well as the arcuate inner face or concave portion 25'.

The once molded parallelepipedic soft core member 20 according to this first embodiment which is extremely flexible, almost unstable, is then housed in the second mold 23, which is also an elongate mold, similar to the first mold 2, but of a larger size. Actually it consists likewise of a casing and a lid and the portion shown in FIG. 6 and identified by reference numeral 23 is only the casing. Both the casing and lid are first filled with randomly distributed glass fibers of different length to ultimately define a reinforcing network for a hard plastic sheathing layer to be formed and which will be described later on. Thus the lower half of the core member 20 is first embedded in the layer of randomly distributed glass fibers 39 with which the casing of the half mold 23 shown, is filled and the respective proyecting loops 21 and 22 (only loop 21 is shown in FIG. 6) are mounted on respective retaining rods, of which only rod 40 is shown, in a similar way as has been explained in connection with rods 13 and 14, so as to maintain the soft core member 20 within the middle of the second mold to be closed by a lid which likewise contains a layer of randomly distributed glass fibers (not shown), so as to completely surround the core member 20 with said glass fibers. One of the end walls of the mold 23, such as end wall 41 is provided with a pipe 42 through which a liquid resin, such as diluted silano A-100 manufactured in the U.S.A., is fed into the closed second mold 23, the purpose of which resin is to glue the layer of randomly distributed glass fibers 39 together and to the core 20. Prior to curing the resin, the closed second mold is turned around so that the pipe 42 becomes an outlet pipe through which the excess of liquid resin may be discharged.

As soon as the curing has been completed, the resulting core member already sheathed with a network or jacket of reinforced fibers, is withdrawn from the previously opened second mold 23, using again the loops 21 and 22 of the cord 12 as handles. The shape of the resulting intermediate product is substantially the same as the one shown in FIG. 2 but of a larger size and where obviously the recesses 33 are already filled with said fibers. This intermediate product which is still flexible, will now be bent and housed in a third mold 43 consisting of a casing 54 and a lid 55 to be described later in connection with FIG. 11.

Due to the recesses 33 the bending of the intermediate portion 32 can be performed without generating any excessive stresses nor cracks in the core member. To specifically explain the shape which such intermediate product will adopt within the third mold 43, reference is first made to FIG. 7.

The bending is performed so that the two straight end portions 28 and 29 will become contiguous and parallel and the intermediate portion 32 will define an open oval shape arcuate portion 32', whereby the first anchoring portions 30, 31 are now inwardly projecting spaced apart anchoring portions, where the outside faces 30' and 31' converge towards the space circumscribed by the oval shaped arcuate portion within which the stringing or netting is to be ultimately located.

Following a similar procedure of manufacture as just described in connection with the above referred to intermediate product, a second arcuate member is formed, hereinafter called "bridge portion", shown in FIG. 8 and identified by reference numeral 44, which is to be clamped between the outside faces 30',31' of the first anchoring portions 30, 31, as clearly shown in FIG. 8; thus already defining together with the oval shaped arcuate portion 32', which is closed thereby, a head frame section 45 (see FIG. 14) and a handle section 46. Thus between the outside face of the bridge portion 44 and the inner face 25 in the portion where the head frame section 45 changes into the handle section 45, a substantially triangular hollow portion 47 with arcuate side faces is formed.

Conveniently the end portions of the bridge portion 44 are linked to the first anchoring portions 30, 31 by means of glass fiber woven tapes 48 (only one visible in FIG. 8).

Each side face 26', 27' (see FIG. 13) of this intermediate one-piece composite member and bridge portion 44 (FIG. 8) is to be sheathed with a resilient flat cover member such as cover member 49 shown in FIG. 9. Said cover member 49 is preferably made of aluminum and has a handle portion 50 and a ring shape head portion 51 which is of oval shape, substantially equal to the shape of the head frame section; the handle portion 50 is of substantially the same shape as the handle section 46. The head portion 51 includes an endless oval shaped inner rim 52 integral with said head portion 51. The height of said rim being less than half the height of the inner face of said head frame section 45. The rim 52, as can be better seen in FIG. 10, has its largest height portion 52' adjacent the handle portion 50 and its lowest height portion 52" at the opposite part thereof. The cross-sectional profile of the rim 52 is decreasing towards the tip or free end, so as to be more resilient there, the purpose of which will be explained later on. The handle portion 50 adjacent the rim 52 has an opening 53, similar to the triangular hollow portion 47.

Turning now to FIG. 11, the intermediate member is to be housed in the third mold 43 in order to sheath it with a hard plastic layer. The third mold 43, again only schematically shown, comprises also a casing 54 and a lid 55, both defining a channel in the shape of a racket. In casing 54 an inside wall 65 is shown to this end which emerges from the bottom portion 66. On the bottom portions of the casing 54 and lid 55, respective ones of these cover members 49 are housed (only one visible in the casing 54), each coated with a binder to link said cover members to the plastic layer to be molded in the third mold 43. One type of binder which may be used is manufactured by K. J. Quinn & Co. Inc. U.S.A., known as PA 05. Since the height of the casing 54 is half of the total mold 43, it is thus extremely simple to eventually directly bend the intermediate member while housing it in the casing and to fit thereafter the bridge portion 44 between the anchoring portions. Once this mounting has been completed, the mold is closed by means of the lid portion 55 which is of substantially the same shape as the casing 54. The projecting portion of the cord member 12 and knots 15, 16 have been previously cut off and after the mold has been closed pins or needles are pushed through the composite member as schematically indicated by the array of arrows 56. This type of needles to define the bores for the string of the stringing to be made in the finished racket is already well-known in the art. Each pin or needle will push through the multifilament cord member 12, separating the filaments of the strand into two halves to tightly surround each needle.

The schematically shown nozzle pipe 57 enables to inject into the closed mold a foamable polyurethane of a larger specific weight, such as of 0.608 which will penetrate the randomly distributed fiber network which will integrate and form thereby a hard plastic sheath (to be foamed) and thereby reinforce as well as completely surround the previously produced soft core member 20. By changing the composition of the resulting polyurethane the weight of the racket structure may be varied at will.

During the curing of the plastic sufficient heat is generated to link the fibers of the end member 12 together to maintain each bore 60 within the cord member, once the needles are withdrawn, after the molding has been completed. The plastic material can again be a polyurethane or another rigid polymeric material such as a polyester resin or an epoxy resin or any foamable resin, such as of the thermosetting or thermoplastic type (nylon, polystyrene, polyethylene, which can be adjusted in density by adding light loads, and as hollow glass spheres or foaming agents (freon). The hard plastic layer becomes anchored on the core member within the head frame section by second anchoring portion 67 due to the anchoring recceses 33, at the same time as suitable hard wall portions are formed to protect the strings against excessive wear and tear. The vibrations which are transmitted by the strings are muffled by the portion of the soft core mamber which surrounds the pertinent string portions. Since in the middle of the soft core member the prestressed cord member surrounds the pertinent string, transmission of the vibrations through the string member from the inner face 25' towards the outer face 24 is successively decreased, and thereby the propagation of these vibrations towards the handle section is diminished.

The composite one-piece member is withdrawn from the third mold, having the shape as shown in FIG. 12 more particularly it consists of the cover members 49 and the visible outer hard plastic, with randomly distributed glass fibers, reinforced layer 58 which in the head section shows the perforations 59.

With reference to FIG. 13, actually each perforation 59 formed in the hard plastic layer 58 is coaxial with the bore 60 which passes through the core member 20 and cord member 12 and which were formed by the previously referred to needles. Between the free end portions of the rims 52 of the cover members 49, an annular ridge 61 of said hard plastic layer is formed and through which the respective end portions of the perforations 59 pass.

Referring now again to FIG. 14, the head frame section 45 is there shown with a taut string or netting 62, defining a striking surface. A pair of pallets 63 (only one visible) are secured to the free end portion of the handle section 46 and wrapped with a thin covering 64 to provide a comfortable grip area.

It will be readily understood that the resulting racket, including the hereinbefore described racket structure, provides an excellent striking surface because the ends of each string section is housed in a hard plastic portion, the resiliency of which in the part where the strings enters the annular ridge 61 is scientificially graduated by means of the inner endless oval shaped rim portions 52 with decreasing thickness toward their respective free end and where the lowest height portion 52" is at the zone of the hard section 45 which is opposite the handle section 46 and where such maximum resiliency is required in case the ball with impact near said zone to enable the player to respond with a good impact action in spite of the fact that at this moment the leverage towards his wrist and fore-arm is considerably increased.

Tests have shown that by using this racket structure, the well-known tireness of the fore-arm and elbow of the player takes much longer to appear.

According to the second embodiment, which will now be described in relationship to FIGS. 15 to 17 and where for the same parts the same references numerals have been used, as in connection with the first embodiment, but preceded by the prefix "100", in lieu of providing the core member (20 FIG. 2) including the arcuate inner face concave portion 25' and the first anchoring portions 30, 31, as previously explained, a simple parallelepipedic member 120 is provided, part of which is shown in FIGS. 15 and 17 and which is of substantially uniform cross-section, preferably of square cross-section along its entire length. The core member 120 according to this second embodiment is likewise extremely flexible, almost unstable, but instead of being then housed in the second mold 23, on those portions which have to resist extremely high tensile forces, such as on the outer face 124 in the portion where the anchoring recesses 133 are present, a strip of loosely woven glass fibers or the like material 168 is adhesively adhered to said outer face 124. In some portions it may be convenient to add several layers of such strips, such as the one shown in dotted lines and identified by reference numerals 169.

Thereafter the thus already slightly reinforced core member is then sheathed with a loosely woven tubular member 170, also made of fiber glass threads or the like and which has a larger cross-sectional area than said core member including already the strip 168 and eventually strip 169, so that the core member can be easily pulled through the tubular member 170 by using for instance loop end portions (21, 22 see FIG. 6) of the cord member 112. Conveniently the tubular member 170 has its warp and weft threads oriented in a sloped direction with regard to the longitudinal axis of the tubular member, which enables to broaden and narrow said tubular member 170, as will be immediately explained. Once the core 120 is entirely housed within the tubular member 170 and retained in position by means of the loop end portions, the tubular member 170 is then stretched by preferably exerting moving pressure around the middle portion of the core and moving the pressure applying means, such as the hands of an operator in opposite directions 173, 173' towards the ends, whereby the tubular member becomes stretched, and actually sheathes the core member 120 and its strip 168 like a glove. Obviously one could conceive also the possibility to insert just one end of the core into a previously pleated tubular member and then stretched said tubular member and moving it along the core and retaining at the same time the other end of the tubular member in a fixed position.

This arrangement of the second embodiment of the reinforced core member can then be directly housed in the third mold (43, FIG. 11) by suitably bending it, without it being necessary to use the second mold (23, FIG. 6), as was required by the first embodiment.

Since in the second embodiment the anchoring portions 30,31 are not necessary, the bridge portion 144, see FIG. 16, consists of an arcuate core member 174, the end portions 175 (only one of which is shown) of which are complementary to the arcuate shape of the arcuate inner face concave portion 181. On the external face 176 of the core member 174, similarly as described in connection with FIG. 15, a strip of loosely woven glass fiber 177 is adhered, the end portion 178 of which projects beyond the end portion 175 and the entire arrangement is then sheathed within a tubular member 179. Both end portions 180 of said tubular member project beyond the respective end portion 178. Again the tubular member is then stretched to become a "glove" around the core member 174. The bridge 144 is then fit within the spaced apart branch portions of the handle section, in a way similar as shown in FIG. 11, but where the end portions 178 and 180 are to replace the glass fiber woven tape 48, shown in FIG. 8.

Thereafter the process of manufacturing the racket is continued as explained in connection with FIG. 11 and following, and accordingly reference is made thereto.

It will be understood, that improvements may be introduced in the embodiments described by way of example and modifications may be made in the construction and materials employed without departing from the scope of the invention.

I claim:

1. A method for manufacturing a racket structure, comprising the steps of:
  (a) providing a first elongate mold defining a center line;
  (b) locating through said mold in the longitudinal direction thereof, coaxial with said center line a cord member;
  (c) prestressing said cord member;
  (d) injecting a light-weight soft plastic in said mold to form a parallelepipedic core member having a first straight end portion, an intermediate portion and a second straight end portion, said core member defining an outer face, an inner face and a pair of opposite side faces, said intermediate portion further having between its outer face and said core member, spaced apart anchoring recesses which are cross-wise arranged to said cord member and ending in said side faces;
  (e) forming a glass fiber reinforcing layer around said core member;
  (f) providing a further mold substantially of the shape of a racket, said further mold including a casing and a lid for said casing and each having a bottom;
  (g) locating on the bottom of said casing and of said lid respectively a resilient, flat cover member having a head portion and a handle portion, each head portion being of oval ring shape including an upstanding inner endless oval rim, which rims are facing each other, but being spaced apart, upon the mold being in closed position;
  (h) bending the intermediate structure achieved in the further mold to form two contiguous, parallel, straight end portions and an intermediate open oval shaped, arcuate portion, locating a bridge portion of the same intermediate structure between and connecting to the confluence of said straight end portions and arcuate portion to close said open oval shaped arcuate portion, locating the bent intermediate structure including said bridge in said casing and between said flat cover members, and closing the casing by means of said lid;
  (i) perforating said closed oval shaped arcuate portion by an array of needles to define bores for the stringing of the racket to be produced and maintaining said needles within their perforations;
  (j) injecting a hard plastic into said mold to cover said core member and becoming located between said flat cover members and bound thereto, whereby said glass fiber reinforcing layer becomes the reinforcement for said hard plastic;
  (k) withdrawing said array of needles and thereafter the resulting racket structure from said further mold.

2. The method of claim 1, wherein after the step (d) the following step is inserted; providing a second elongate mold of larger size than said first mold, locating the core member molded in said first mold, in said second mold having previously randomly distributed glass fibers therein to form said glass fiber reinforcing layer around said core member, adding a binding resin into said second mold to interconnect the glass fibers against themselves into said core, said further mold cited in step (f) thus becoming a third mold.

3. The method of claim 1, wherein said flat cover members, which are made of aluminium, are first coated with a binder on the face, to face said glass fibers.

4. The method of claim 2, wherein said intermediate structure which is bent and housed in the third mold to form two contiguous, parallel straight end portions and an intermediate open shape, arcuate portion, including inwardly projecting, spaced apart anchoring portions enables to connect thereto said bridge portion by means of glass fiber woven tapes.

5. The method of claim 1, wherein the free end portion of the handle section of the resulting racket structure, on the outside faces of said flat cover members, is provided with a pallet each, and the whole is surrounded by a covering to define a grip.

6. The method of claim 1, wherein said forming of said glass fiber reinforcing layer around said core member of step (e) comprises, providing at least one strip of loosely woven glass fiber and adhering said strip to at least portions of the outer face of said core member, thereafter sheathing the core member within a loosely woven glass fiber tubular member, stretching said tubular member by pulling on both end portions thereof, in opposite directions to form a glove-like sheath around said core member by means of said tubular member and then housing the resultant member in said further mold according to step h.

* * * * *